US009804299B2

(12) United States Patent
Dai et al.

(10) Patent No.: US 9,804,299 B2
(45) Date of Patent: Oct. 31, 2017

(54) COMPOUND REFLECTIVE PLATE AND METHOD FOR MANUFACTURING SAME

(71) Applicant: HON HAI PRECISION INDUSTRY CO., LTD., New Taipei (TW)

(72) Inventors: Feng-Yuen Dai, New Taipei (TW); Chau-Jin Hu, New Taipei (TW); Kun-Chan Wu, New Taipei (TW); Jia-Ming Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 271 days.

(21) Appl. No.: 14/801,254

(22) Filed: Jul. 16, 2015

(65) Prior Publication Data

US 2016/0313479 A1 Oct. 27, 2016

(30) Foreign Application Priority Data

Apr. 23, 2015 (TW) ............................ 104113114 A

(51) Int. Cl.
*G02B 5/02* (2006.01)
*G02B 1/10* (2015.01)

(52) U.S. Cl.
CPC ............ *G02B 1/10* (2013.01); *G02B 5/0221* (2013.01); *G02B 5/0242* (2013.01); *G02B 5/0284* (2013.01)

(58) Field of Classification Search
CPC ...... G02B 1/10; G02B 5/0221; G02B 5/0242; G02B 5/0284
USPC ................................................ 359/599, 900
See application file for complete search history.

(56) References Cited

U.S. PATENT DOCUMENTS 4,463,089 A * 7/1984 Bouldin ................ G11B 7/251 346/135.1
6,217,176 B1 * 4/2001 Maekawa .............. G02B 1/111 359/599
6,852,376 B2 * 2/2005 Chien ..................... C09D 5/00 349/112
7,567,383 B2 * 7/2009 Nagahama .......... B29C 37/0053 349/112
7,656,580 B2 * 2/2010 Chang ................. G02B 5/0215 359/452
9,164,204 B2 * 10/2015 Kodama ............. G02B 5/0221
2008/0030861 A1 * 2/2008 Ookubo .................. C08J 7/047 359/601
2009/0002832 A1 * 1/2009 Tochigi ............... G02B 5/0226 359/599
2009/0128917 A1 * 5/2009 Yoshinari ............ G02B 5/0226 359/601
2009/0130340 A1 * 5/2009 Chang .............. G02F 1/133606 428/1.1

(Continued)

Primary Examiner — Ricky D Shafer
(74) Attorney, Agent, or Firm — Steven Reiss

(57) ABSTRACT

A compound reflective plate includes a metal base and a reflective film. The metal base includes a reflective surface. The reflective film is covering the reflective surface. The reflective film includes colloidal transparent substrate, reflective particles, and diffusion particles. A surface of the reflective film opposite to the metal base is a rough, irregular, and curved surface. A mass ratio of the diffusion particles to the sum of the colloidal transparent substrate and the reflective particles ranges from 0.05 to 0.07. A mass ratio of the reflective particles to the colloidal transparent substrate ranges from 0.25 to 0.54.

16 Claims, 2 Drawing Sheets

100
22 21 23 25 20 24 11 10 12

(56) References Cited

U.S. PATENT DOCUMENTS

| | | | | |
|---|---|---|---|---|
| 2013/0301135 | A1 * | 11/2013 | Nishimura | G02B 5/0294<br>359/599 |

* cited by examiner

COMPOUND REFLECTIVE PLATE AND METHOD FOR MANUFACTURING SAME

FIELD

The subject matter herein generally relates to a compound reflective plate and a method for manufacturing the compound reflective plate.

BACKGROUND

In a backlight module, when a position of a light source is determined, a transmitting direction of light emitting from the light source is determined as well. The light incident can only be transmitted in a single direction into a light guide plate. A plurality of microstructures is defined on the light guide plate to change the transmitting direction of the light incident into the light guide plate.

BRIEF DESCRIPTION OF THE DRAWINGS

Implementations of the present technology will now be described, by way of example only, with reference to the attached figures.

DETAILED DESCRIPTION

Figure 1:
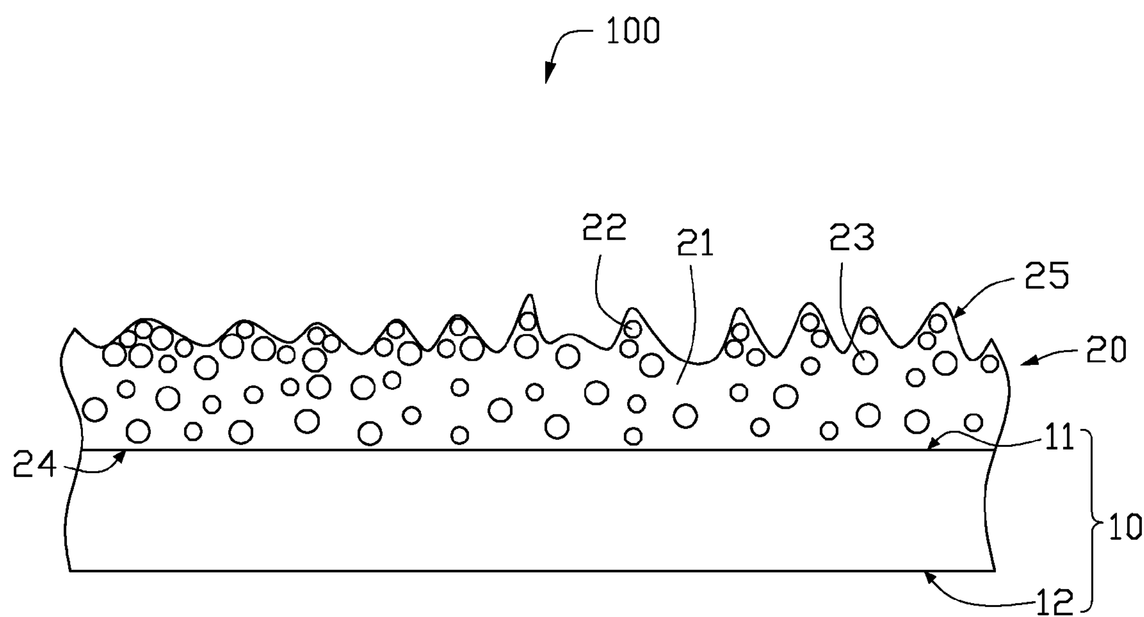
FIG. 1 is a diagrammatic view of an embodiment of a compound reflective plate.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially a plate" means that the object resembles a plate, but can have one or more deviations from a true plate. The term "comprising," when utilized, means "including, but not necessarily limited to"; it specifically indicates open-ended inclusion or membership in the so-described combination, group, series and the like.

The present disclosure is described in relation to a compound reflective plate comprising a metal base and a reflective film. The metal base comprises a reflective surface. The reflective film is covering the reflective surface. The reflective film comprises colloidal transparent substrate, reflective particles, and diffusion particles. A surface of the reflective film opposite to the metal base is a rough, irregular, and curved surface. A mass ratio of the diffusion particles to the sum of the colloidal transparent substrate and the reflective particles ranges from 0.05 to 0.07. A mass ratio of the reflective particles to the colloidal transparent substrate ranges from 0.25 to 0.54.

FIG. 1 illustrates a compound reflective plate 100 of an embodiment. The compound reflective plate 100 includes a metal base 10 and a reflective film 20 covering the metal base 10.

The metal base 10 is substantially a plate. The metal base 10 can be made of material chosen from copper, aluminum, or other types of metal. The metal base 10 includes a top surface 11 and a bottom surface 12. The top surface 11 is preferably a substantially flat and smooth reflective surface. The top surface 11 and the bottom surface 12 are positioned at opposite sides of the metal base 10. In one embodiment, the top surface 11 and the bottom surface 12 are substantially parallel to each other. The metal base 10 is configured to support the reflective film 20.

The reflective film 20 is formed on the top surface 11. In one embodiment, the reflective film 20 covers the entire top surface 11, but the present disclosure is not so limited. The reflective film 20 is made of mixture consisting of a colloidal transparent substrate 21, a plurality of reflective particles 22 (shown as smaller circles in FIG. 1), and a plurality of diffusion particles 23 (shown as larger circles in FIG. 1). The reflective film 20 includes a lower surface 24 and an upper surface 25. The lower surface 24 and the upper surface 25 are positioned at opposite sides of the reflective film 20. The lower surface 24 contacts the top surface 11. The upper surface 25 is rough and irregular with multiple curves.

The colloidal transparent substrate 21 is made of transparent material, such as heat curing agent, or UV-curing agent. In one embodiment, the colloidal transparent substrate 21 is a heat curing agent. In detail, the colloidal transparent substrate 21 is a mixture of polyester polyol, isocyanic acid, and acetic acid butyl ester. A mass ratio of the sum of the polyester polyol and the isocyanic acid to the acetic acid butyl ester is in a range from 0.3 to 0.6.

In another embodiment, the colloidal transparent substrate 21 is UV-curing agent. In detail, the colloidal transparent substrate 21 is a mixture of a series of acrylic monomers, polyurethane acrylic oligomer, polyester acrylic modified polyester oligomer, and photo-initiator. In the present embodiment, the acrylic monomers are isobornyl methacrylate. The polyurethane acrylic oligomer is aliphatic urethane acrylate. The polyester acrylic modified polyester oligomer is carboxylated polyester acrylate. The photo-initiator is hydroxycyclohexyl-phenyl-ketone. In the colloidal transparent substrate 21, a mass ratio of the acrylic monomers, the polyurethane acrylic oligomer, the polyester acrylic modified polyester oligomer, and the photo-initiator is 10:6:3:1.

The reflective particles 22 can be barium sulfate or titanium dioxide. In one embodiment, the reflective particles 22 have the same diameter, and the diameter of each reflective particle 22 ranges from 0.2 microns to 0.3 microns. A mass ratio of the reflective particles 22 to the colloidal transparent substrate 21 is in a range from 0.25 to 0.54. In other embodiments, the reflective particles 22 have different diameters.

The diffusion particles 23 are made of materials chosen from one or more of poly methyl methacrylate, polystyrene, copolymer of poly methyl methacrylate and polystyrene, and silicon dioxide. The diffusion particles 23 can be hollow or solid structures. In one embodiment, the diffusion particles 23 can have the same diameter, and the diameter of each diffusion particles ranges from 5 microns to 300 microns. A mass ratio of the diffusion particles 23 to the sum of the colloidal transparent substrate 21 and the reflective particles 22 ranges from 0.05 to 0.07. In other embodiments, the diffusion particles 23 have different diameters.

Figure 2:
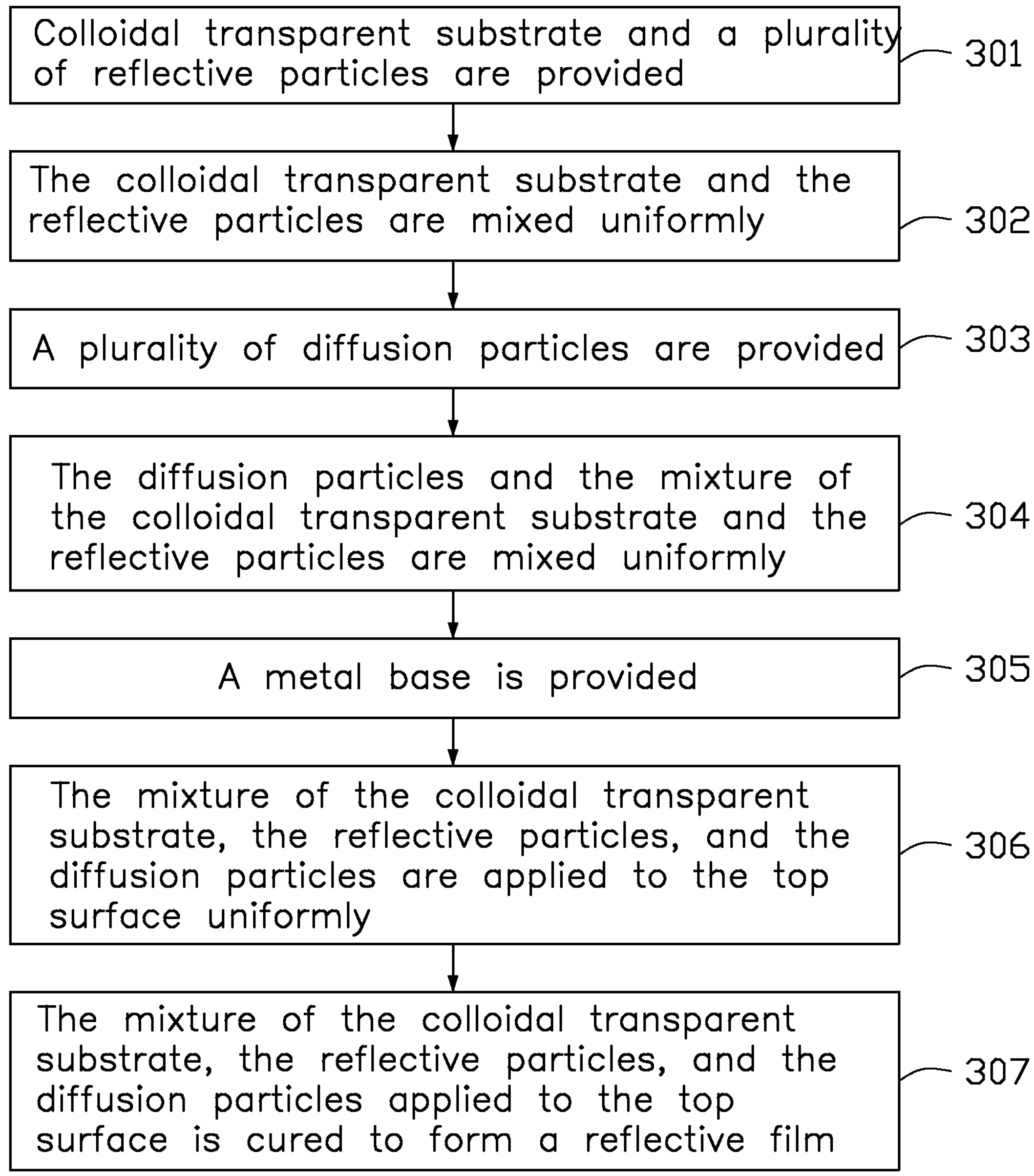
FIG. 2 is a flow chart of an embodiment of manufacturing the compound reflective plate of FIG. 1.

FIG. 2 illustrates a flowchart presented in accordance with an example embodiment. The example method 300 for manufacturing a compound reflective plate 100 (shown in FIG. 1) is provided by way of an example, as there are a variety of ways to carry out the method. Each block shown in FIG. 2 represents one or more processes, methods or subroutines, carried out in the exemplary method 300. Additionally, the illustrated order of blocks is by example only and the order of the blocks can change according to the present disclosure. The exemplary method 300 can begin at block 301.

At block 301, colloidal transparent substrate 21 and a number of reflective particles 22 are provided.

In one embodiment, the colloidal transparent substrate 21 is a heat curing agent. The colloidal transparent substrate 21 is a mixture of polyester polyol, isocyanic acid, and acetic acid butyl ester. A mass ratio of the sum of the polyester polyol and the isocyanic acid to the acetic acid butyl ester is in a range from 0.3 to 0.6.

In other embodiments, the colloidal transparent substrate 21 is UV-curing agent. The colloidal transparent substrate 21 is a mixture of a series of acrylic monomers, polyurethane acrylic oligomer, polyester acrylic modified polyester oligomer, and photo-initiator. In one embodiment, the acrylic monomers are isobornyl methacrylate. The polyurethane acrylic oligomer is aliphatic urethane acrylate. The polyester acrylic modified polyester oligomer is carboxylated polyester acrylate. The photo-initiator is hydroxycyclohexyl-phenyl-ketone. In the colloidal transparent substrate 21, a mass ratio of the acrylic monomers, the polyurethane acrylic oligomer, the polyester acrylic modified polyester oligomer, and the photo-initiator is 10:6:3:1.

The reflective particles 22 can be barium sulfate or titanium dioxide. In one embodiment, the reflective particles 22 have the same diameter, and the diameter of each reflective particle 22 ranges from 0.2 microns to 0.3 microns.

At block 302, the colloidal transparent substrate 21 and the reflective particles 22 are mixed uniformly.

A mass ratio of the reflective particles 22 to the colloidal transparent substrate 21 is in a range from 0.25 to 0.54.

At block 303, a number of diffusion particles 23 are provided.

The diffusion particles 23 are made of materials chosen from one or more of poly methyl methacrylate, polystyrene, copolymer of poly methyl methacrylate and polystyrene, and silicon dioxide. The diffusion particles 23 can be hollow or solid structures. In one embodiment, the diffusion particles 23 have the same diameter, and the diameter ranges from 5 microns to 300 microns.

At block 304, the diffusion particles 23 and the mixture of the colloidal transparent substrate 21 and the reflective particles 22 are mixed uniformly.

A mass ratio of the diffusion particles 23 to the sum of the colloidal transparent substrate 21 and the reflective particles 22 ranges from 0.05 to 0.07.

At block 305, a metal base 10 is provided.

The metal base 10 is substantially a plate. The metal base 10 can be made of material chosen from copper, aluminum, or other types of metal. The metal base 10 includes a top surface 11 and a bottom surface 12. The top surface 11 and the bottom surface 12 are positioned at opposite sides of the metal base 10. In one embodiment, the top surface 11 and the bottom surface 12 are substantially parallel to each other. The top surface 11 is a flat and smooth reflective surface.

At block 306, the mixture of the colloidal transparent substrate 21, the reflective particles 22, and the diffusion particles 23 are applied uniformly to the top surface 11.

In one embodiment, the mixture of the colloidal transparent substrate 21, the reflective particles 22, and the diffusion particles 23 applied to the top surface 11 covers the entire top surface 11. The mixture of the colloidal transparent substrate 21, the reflective particles 22, and the diffusion particles 23 applied to the top surface 11 forms a uniform thin film.

At block 307, the mixture of the colloidal transparent substrate 21, the reflective particles 22, and the diffusion particles 23 applied to the top surface 11 is cured to form a reflective film 20.

The reflective film 20 includes an upper surface 25 and a lower surface 24. The upper surface 25 and the lower surface 24 are positioned at opposite sides of the reflective film 20. The lower surface 24 contacts the top surface 11. When curing, the diffusion particles 23 in the mixture applied to the top surface 11 accumulate to make the upper surface 25 a rough, irregular, and curved surface.

The embodiments shown and described above are only examples. Many details are often found in the art such as the other features of a compound reflective plate and method for manufacturing the compound reflective plate. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A compound reflective plate comprising:

a metal base having a reflective surface;

a reflective film covering the reflective surface, comprising a colloidal transparent substrate, a plurality of reflective particles, and a plurality of diffusion particles, wherein, a surface of the reflective film opposite to the metal base is a rough, irregular, and curved surface, a mass ratio of the diffusion particles to the sum of the colloidal transparent substrate and the reflective particles ranges from 0.05 to 0.07, and a mass ratio of the reflective particles to the colloidal transparent substrate ranges from 0.25 to 0.54.

2. The compound reflective plate of claim 1, wherein the metal base is made of copper, or aluminum.

3. The compound reflective plate of claim 2, wherein the metal base comprises a top surface and a bottom surface, the top surface and the bottom surface are positioned at opposite sides of the metal base, and the top surface is the reflective surface.

4. The compound reflective plate of claim 2, wherein the top surface and the bottom surface are substantially parallel to each other.

5. The compound reflective plate of claim 1, wherein the colloidal transparent substrate is a heat curing agent.

6. The compound reflective plate of claim 5, wherein the colloidal transparent substrate is a mixture of polyester polyol, isocyanic acid, and acetic acid butyl ester, a mass ratio of the sum of the polyester polyol and the isocyanic acid to the acetic acid butyl ester ranges from 0.3 to 0.6.

7. The compound reflective plate of claim 1, wherein the colloidal transparent substrate is an UV-curing agent.

8. The compound reflective plate of claim 7, wherein the colloidal transparent substrate is a mixture of a series of acrylic monomers, polyurethane acrylic oligomer, polyester acrylic modified polyester oligomer, and photo-initiator, a mass ratio of the acrylic monomers, the polyurethane acrylic oligomer, the polyester acrylic modified polyester oligomer, and the photo-initiator is 10:6:3:1.

9. The compound reflective plate of claim 8, wherein the acrylic monomers are isobornyl methacrylate, the polyurethane acrylic oligomer is aliphatic urethane acrylate, the polyester acrylic modified polyester oligomer is carboxylated polyester acrylate, and the photo-initiator is hydroxycyclohexyl-phenyl-ketone.

10. The compound reflective plate of claim 1, wherein the reflective particles are barium sulfate or titanium dioxide.

11. The compound reflective plate of claim 10, wherein the reflective particles have the same diameter, and the diameter of each reflective particle ranges from 0.2 microns to 0.3 microns.

12. The compound reflective plate of claim 1, wherein the diffusion particles is made of materials chosen from one or more of poly methyl methacrylate, polystyrene, copolymer of poly methyl methacrylate and polystyrene, and silicon dioxide.

13. The compound reflective plate of claim 1, wherein the diffusion particles are hollow or solid structures.

14. The compound reflective plate of claim 1, wherein the diffusion particles have the same diameter, and the diameter of each diffusion particle ranges from 5 microns to 300 microns.

15. A method for manufacturing a compound reflective plate comprising:

providing colloidal transparent substrate and a plurality of reflective particles;

mixing the colloidal transparent substrate and the reflective particles uniformly, a mass ratio of the reflective particles to the colloidal transparent substrate ranging from 0.25 to 0.54;

providing a plurality of diffusion particles;

mixing the diffusion particles and the mixture of the colloidal transparent substrate and the reflective particles uniformly, a mass ratio of the diffusion particles to the sum of the reflective particles and the colloidal transparent substrate ranging from 0.05 to 0.07;

providing a metal base, comprising a reflective surface;

applying the mixture of the diffusion particles, the reflective particles, and the colloidal transparent substrate to the reflective surface;

curing the mixture of the diffusion particles, the reflective particles, and the colloidal transparent substrate applied to the reflective surface to form a reflective film.

16. A method for manufacturing a compound reflective plate comprising:

first uniformly mixing a colloidal transparent substrate and reflective particles, a mass ratio of the reflective particles to the colloidal transparent substrate ranging from 0.25 to 0.54;

second uniformly mixing diffusion particles and the mixture of the colloidal transparent substrate and the reflective particles, a mass ratio of the diffusion particles to the sum of the reflective particles and the colloidal transparent substrate ranging from 0.05 to 0.07;

applying the mixture of the diffusion particles, the reflective particles, and the colloidal transparent substrate to a reflective surface;

curing the mixture of the diffusion particles, the reflective particles, and the colloidal transparent substrate applied to the reflective surface to form a reflective film.

* * * * *